July 16, 1968  R. F. DUHAMEL ET AL  3,393,289

SELF-CLEANING ELECTRON BEAM EXIT ORIFICE

Filed Nov. 12, 1964

INVENTORS
RAYMOND F. DUHAMEL
ROBERT C. HOLLAND
BY Roger A. Van Kirk
ATTORNEY

3,393,289
SELF-CLEANING ELECTRON BEAM
EXIT ORIFICE
Raymond F. Duhamel, Vernon, Conn., and Robert C. Holland, Springfield, Mass., assignors to United Aircraft Corporation, East Hartford, Conn., a corporation of Delaware
Filed Nov. 12, 1964, Ser. No. 410,539
11 Claims. (Cl. 219—121)

ABSTRACT OF THE DISCLOSURE

This invention relates to the working of materials out of vacuum with a beam of charged particles. An electron beam is generated in a vacuum chamber and passes out of the vacuum chamber to a workpiece environment through a beam exit aperture and gas seal. A stream of gas is discharged through the beam exit aperture at an angle of between 30° to 60° to the beam axis so that vapors and spatter emanating from the beam impingement point on the workpiece will be washed away from the aperture and the flow of environmental gas from the workpiece region into the evacuated beam generator will simultaneously be inhibited.

---

This invention relates to the working of materials with a beam of charged particles. More particularly, this invention relates to performing operations such as welding, cutting, melting, evaporating, or machining of any material with an electron beam.

Devices which use the kinetic energy of an electron beam to work a material are presently commercially available. Such devices are generally known as electron beam machines. U.S. Patent No. 2,987,610, issued June 6, 1961, to K. H. Steigerwald, discloses such a machine. These machines operate by generating a highly focused beam of electrons. The electron beam is a welding, cutting and machining tool which has practically no mass but has substantial kinetic energy due to the fact that high momentum is imparted to the electrons. Transfer of this kinetic energy to the lattice electrons of the workpiece generates higher lattice vibrations which cause an increase in the temperature within the impingement area sufficient to accomplish work. To achieve the deep penetration of the electron beam into the work shown and discussed in the above mentioned Steigerwald patent, the intensity or power density of the beam is caused to exceed a threshold level which varies according to the material being worked. Once this threshold level for beam intensity has been exceeded, the beam will penetrate deeply into the work and the kinetic energy of the electrons will be transferred directly to the work along the entire depth of penetration. If the beam is then moved relative to the work, the material melted through this direct energy transfer will flow together thus producing a fusion zone having the high depth-to-width ratio characteristic of the welding method disclosed and claimed in the Steigerwald patent.

Among the advantages of using an electron beam or the like are inertialess control and great energy concentration. However, until recently, these advantages were somewhat offset by the fact that electron beam operations had to be performed in an evacuated chamber. Working in the absence of gas was considered necessary for several reasons. First, any gas in the region surrounding the material being worked may be absorbed by and thus tend to cause impurities or irregularities in the workpiece. Secondly, and more important, the presence of gas causes scattering and attenuation of the electron beam thereby preventing the precise focusing and high power density necessary to accomplish work at one spot without material adjacent thereto being affected through heat conductivity. This scattering problem is further aggravated by the cloud of vaporized material emanating from the beam impingement point on workpiece. Thirdly, operating an electron emitter in a vacuum of less than $10^{-4}$ torr improves arc-over characteristics and increases the filament life.

As noted, the aforementioned considerations have, until recently, dictated that the working of materials with a beam of charged particles be performed in an evacuated chamber. This approach, however, entailed an obvious disadvantage in that the size of the piece that could be worked with the beam was limited by the size of the chamber. For smaller parts, this restriction is acceptable but inconvenient. For extremely large parts, the cost of the vacuum chamber and associated pumps is so expensive that the process generally becomes economically unfeasible. Accompanying this economic problem is the inconvenience inherent in the time-consuming task of pumping down the work chamber to the desired degree of vacuum after each new workpiece is inserted therein.

It thus became apparent to those skilled in the art that, in cases where contamination of the workpiece was not an extremely critical problem, means should be found to bring the electron beam out of the evacuated container in which it must be generated without material attenuation thereby overcoming the above-mentioned problems and disadvantages and yet realizing the benefits inherent in working with a high intensity electron beam. To accomplish the foregoing, various schemes have been proposed and, in some cases, utilized. However, these prior art methods, as exemplified by U.S. Patents Nos. 2,640,948, 2,816,231, 2,824,232, and 2,899,556, have met with little success. In most of these prior art approaches, the beam exits to the workpiece through a small aperture. From an economic standpoint, the beam exit aperture must be small in order to minimize leakage of gas into the evacuated beam generator region thereby minimizing the size and corresponding cost of the necessary vacuum pumping apparatus. Also, the beam exit aperture must, in order to minimize attenuation or the length of the path which the beam must travel through a gaseous atmosphere, be positioned relatively close to the work. As a result of the extremely high power densities involved in welding, cutting, melting, evaporating or machining any material with a beam of charged particles, both vapors and splatter emanate from the beam impingement point on the workpiece. These particles and vapors tend to collect at and thus cause rapid clogging of the small, adjacently located beam exit aperture. Further, this relatively dense cloud of debris rising from the beam impingement point causes scattering of the beam.

This invention overcomes the above-described clogging and scattering problems by providing a novel self-cleaning exit aperture system.

It is therefore an object of this invention to work materials in a gaseous atmosphere with a beam of charged particles.

It is a further object of this invention to transmit a beam of charged particles from a low pressure region to a region of relatively high pressure without material attenuation.

It is also an object of this invention to prevent clogging of an opening through which a beam of charged particles is directed at a workpiece.

These and other objects of this invention are accomplished by directing a stream of gas into the workpiece environment through the beam exit aperture at an angle to the beam axis so that vapors and splatter emanating from the beam impingement point on the work will be washed away from said aperture and the flow of environmental gas from the workpiece region into the evacuated beam generator will simultaneously be inhibited.

This invention may be better understood and its numerous advantages will become apparent to those skilled in the art by reference to the accompanying drawing wherein like reference numerals apply to like elements in the various figures and in which.

Figure 1:
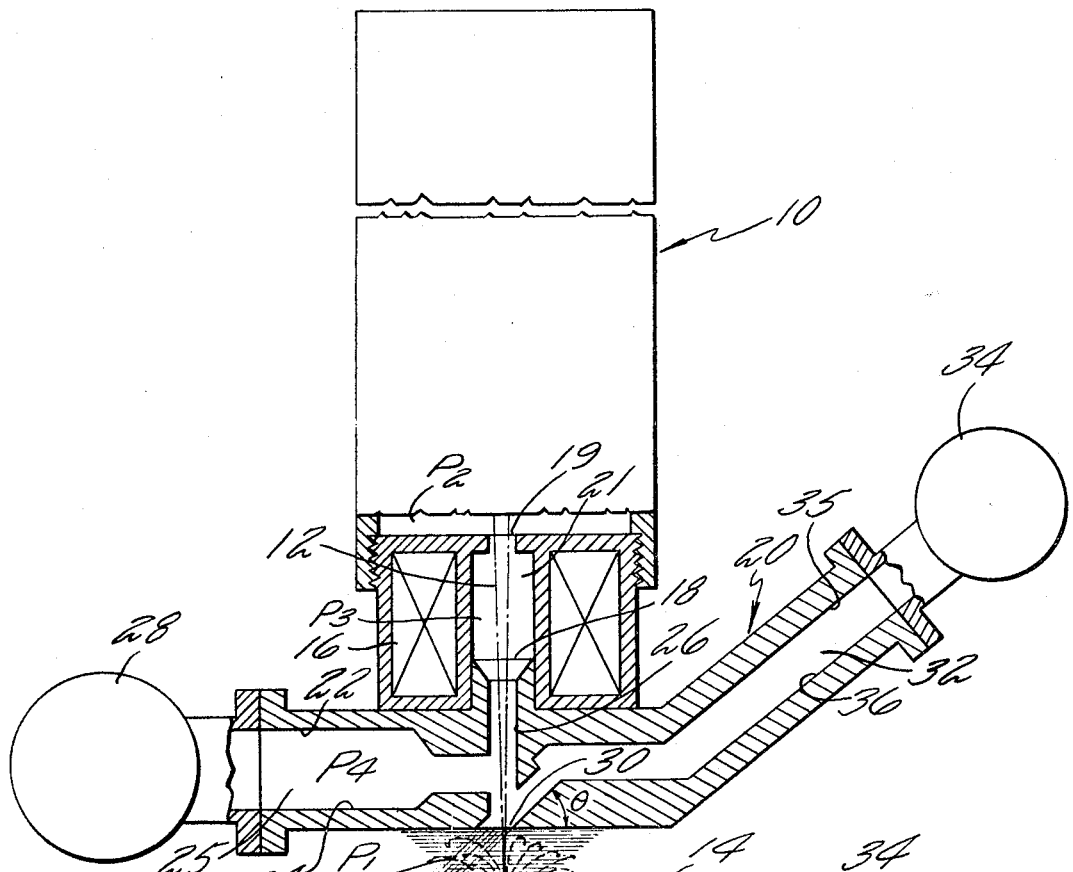
FIGURE 1 is a cross-sectional view of a first embodiment of this invention.

In FIGURE 1, reference numeral 10 indicates an electron beam generator. For a complete disclosure of a state of the art electron beam generator of the type employed in commercially available welding and cutting machines and typical of those with which this invention is intended for use, reference is made to above-mentioned Steigerwald U.S. Patent No. 2,987,610. It is an object of this invention to obviate the necessity of utilizing an evacuated work chamber, such as chamber 24 of FIGURE 1 of the Steigerwald patent, when working materials with an intense beam of charged particles. As is well known in the art and as shown by the Steigerwald patent, beam generator or column 10 contains means, not shown, for emitting electrons, focusing the electrons into a beam and accelerating the beam toward a workpiece. The beam generated in cloumn 10 is indicated at 12. The workpiece, which may be two flat plates to be joined by a butt weld, is shown at 14. Workpiece 14 will, when practicing this invention, be in the atmosphere or a region of relatively high gas pressure, P1. Column 10 is evacuated and maintained at a low pressure P2, by vacuum pumping means, not shown, of any type well known in the art. The beam 12 generated in column 10 is focussed at the workpiece by a mangetic lens assembly 16 which is supplied with current from a variable current supply, not shown. The electron beam exists from column 10 through an opening 19 and proceeds to opening 18 which will be below or, as shown, adjacent magnetic lens assembly 16. The region 21 between openings 18 and 19 will be maintained at a pressure P3 by vacuum pumping means, not shown. Thus, the region 21 will form the second stage of a cascaded vacuum system.

Positioned between beam exit opening 18 and workpiece 14 is a housing indicated generally at 20. Housing 20 defines a path for beam passage to the workpiece region, the final stage of a cascaded vacuum system and a self-cleaning beam exit aperture. It has been known that, although with slight attentuation, a beam of charged particles can be transmitted from an evacuated chamber to a region of higher pressure by passing it through a series of chambers of increasing pressure. For an example of such a cascaded vacuum system, reference may be had to U.S. Patent No. 2,899,556, issued Aug. 11, 1959, to E. Schopepr et al. These chambers of increasing pressure, which are pumped down by associated vacuum pumping equipment, prevent leakage of gas into the evacuated beam generator while simultaneously reducing the probability of collisions between electrons in the beam and gas molecules. In order to provide the third stage of a cascaded vacuum system, housing 20 is machined to provide a pair of opposed inner and outer wall surfaces 22 and 24 which define therebetween a passageway 25 communicating with the beam passageway 26. Since the other end of passageway 25 is in communication with a vacuum pump 28, opposed wall surfaces 22 and 24 define the third stage in a three-stage cascaded vacuum system, the first stage being evacuated beam column 10 and the second stage being the evacuated section 21. This third stage is continuously pumped down to a pressure P4 by vacuum pump 28. Due to leakage of gas from the workpiece environment, which gas tries to flow into the low pressure environment maintained in column 10, pump 28 will maintain pressure P4 only slightly higher than pressure P3.

As noted above, in the working of materials in a gaseous environment with a high intensity beam of charged particles it has been found that the aperture through which the beam exists to the workpiece region tends to become clogged by vapors and particles rising from the material being worked. Thus, it becomes necessary to devise means to deflect this debris away from the final beam exit opening, such as aperture 30 which forms the downstream end of passageway 26, without substantially increasing the possibility of collision between electrons in the beam and gas molecules. In accordance with this invention, the foregoing is accomplished by utilizing a stream of secondary gas travelling at an angle to the axis of the electron beam. This stream of secondary gas is directed across the beam axis and out through the beam exit aperture so as to wash vapors and particles rising from workpiece 14 away from aperture 30. In order to provide a path fo the flow of this secondary gas, housing 20 is machined to also provide a gas supply passageway 32. Supply passageway 32 communicates, at its upstream end, with a pressurized source of gas 34. The secondary gas from source 34, the pressure of which has been found to be preferably between 20 and 30 p.s.i., flows through passageway 32 and, at the downstream end thereof is discharged adjacent and at an angle to the axis of beam 12. As shown in FIGURE 1, the velocity of the secondary gas flowing through passageway 32 will, since opposed inner and outer wall surfaces 35 and 36 do not define a nozzle therebetween, be flowing at subsonic velocity. The discharge angle, $\theta$, may be between 30° and 60° but has been found to preferably lie between 40° and 50°. Below 40°, when employing subsonic flow, there is a tendency for beam exit aperture 30 to become clogged. Above 50°, with either subsonic or supersonic flow, there is danger that the molten puddle at the beam impingement point will be blown away from the desired weld region and/or be aerated by the stream of secondary gas thus destroying the weld quality. In operation, the beam passes out of beam forming column 10 through exit openings 19 and 18, traverses passageway 26 in housing 20, exists through aperture 30 and impinges on work 14. Since both the beam and the secondary gas are discharged through beam exit aperture 30, the problem caused by splatter clogging this aperture is virtually eliminated.

In fabrication of the embodiment shown in FIGURE 1, certain design criteria must be observed. Firstly, the point of injection of the stream of secondary gas must be slightly below the point of communication of evacuated passageway 25 with beam passageway 26. Secondly, the downstream edge 38 of beam exit orifice 30 must present an angular surface, in the direction of gas flow, to the secondary gas stream. As shown in FIGURE 1, angular surface 38 is produced by removal of material from the downstream edge of orifice 30. The angular surface thus presented prevents the gas flow from being deflected directly into the molten weld material and prevents turbulence which would otherwise interfere with the secondary gas flow.

Figure 2:
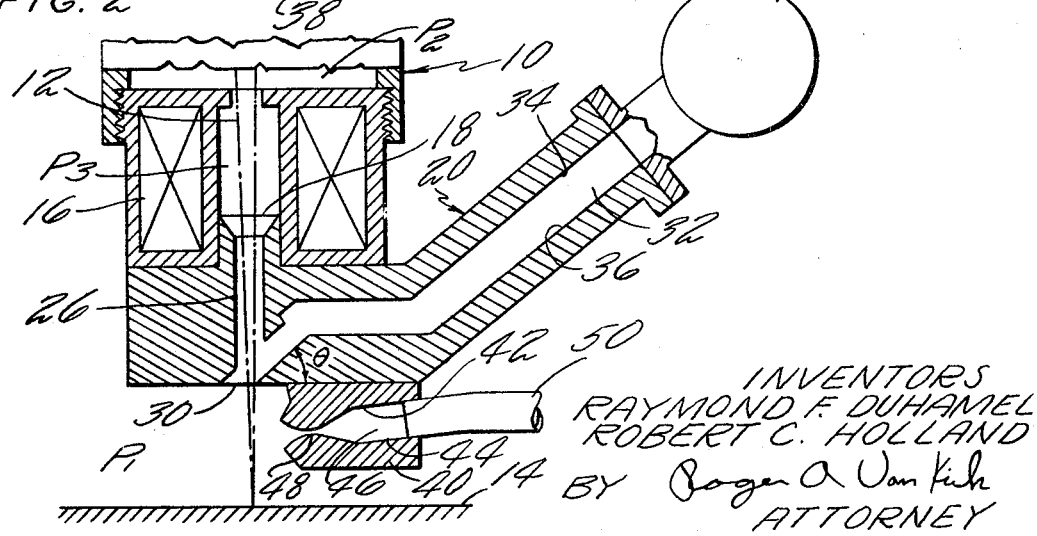
FIGURE 2 is a cross-sectional view of a modification of the embodiment of FIGURE 1 which permits elimination of one stage of vacuum pumping.

Considering now FIGURE 2, a second embodiment of this invention is disclosed wherein the third stage of vacuum pumping of the embodiment of FIGURE 1 has been eliminated. In order to accomplish the foregoing and yet substantially eliminate the leakage of environmental gas into chamber 10, a gaseous seal is provided across exit aperture 30. For this purpose there is provided a second housing 40 affixed to the lower side of housing 20. Housing 40 is machined to provide oppositely disposed inner and outer wall surfaces 42 and 44 which together define a gas supply passageway 46 having a nozzle 48 therein. The upstream end of passageway 46 is connected to a pressurized source of gas, not shown, by means of a conduit 50. The pressure of the gas supplied to passageway 46 is sufficient to cause supersonic flow downstream of nozzle 48. Nozzle 48 discharges adjacent the axis of beam 12 and is directed toward the surface of the workpiece at a slight angle. In practice, it has been found that the stream of gas discharged from nozzle 48 should intersect a plane which is parallel to the surface of the work at an angle of between 5° and 10°. The combination of the supersonic sealing gas flow from nozzle 48 and the subsonic secondary gas flow from passageway 32 effectively blocks environmental gas from flowing up into beam pasageway 26. In actual practice, it has been found that the pressure in passageway 26 will drop 50 $\mu$ when gas is flowing through passageways 32 and 46. Thus, it may be seen that not only is clogging of the exit aperture 30 prevented but that also a self-pumping effect is realized.

As indicated above, not only must this invention serve to prevent clogging of the beam exit aperture, but it must also minimize beam attenuation by reducing as far as possible the probability of collision between electrons and gas molecules. In accordance with this invention, the critical point in the reduction of this collision probability is not the velocity of the gas or gases employed. That is, the embodiments of FIGURE 1 and 2 will be operative with the secondary gas discharged from passageway 32 flowing at subsonic velocity. Nevertheless, by minimizing the length of the path of the electron beam through the secondary gas stream, the probability of the substantial number of collisions is eliminated. In actual practice, the supply passageway for the secondary gas may comprise a .04 inch diameter conduit which discharges adjacent, across and at an angle to a beam exiting from an orifice also having a diameter of .04 inch. Thus, the path in which the secondary gas will increase the probability of collision has approximaely the shape of a cylinder only .04 inch long and .04 inch in diameter. Obviously, the collision probability may be further reduced by employing a lightweight inert gas such as dry nitrogen or helium in the secondary stream.

The disclosed embodiments of this invention precipitates substantial advantages over the prior art. For example, the simple design permits inexpensive construction and simple maintenance. In addition to simplicity and ease of maintenance, gas consumption will be relatively small since low velocity gas may be employed. Further since the walls of housing 20, are relatively thick, they can be easily provided with passages for cooling fluid thereby minimizing the problem of errosion.

While a preferred embodiment thereof has been shown and described, various modifications and substitutions may be made without deviating from the spirit and scope of this invention. For example, the secondary gas could be injected across the beam axis from more than one direction. Similarly, while shown as being generally rectangular in cross-section, the secondary gas passageway may be round or square. Thus, this invention is described by way of illustration rather than limitation and accordingly it is understood that this invention is to be limited only by the appended claims taken in view of the prior art.

We claim:
1. Apparatus for working material in a gaseous environment with an intense beam of charged particles comprising:
   means for generating a beam of charged particles, said beam having an axis;
   an evacuated vessel containing at least a portion of said beam generating means, said vessel defining an opening for transmission of said beam;
   means defining a beam passage communicating at one end with said vessel opening and having its other end defining an exit aperture through which the beam may pass into the environment surrounding the material to be worked, the axis of said beam passage being aligned with the beam axis;
   means for directing the beam out of said vessel through said opening and beam passage so that the beam may impinge on a material to be worked located outside of the vessel in a gaseous environment;
   a source of gas under pressure;
   means defining a gas supply passageway connected at its inlet end to said source of gas and having its outlet end arranged to discharge a stream of gas through said beam exit aperture into the environment surrounding the material to be worked at an angle of between 30° and 60° with respect to the beam axis; and
   means located along the beam axis in proximity to the discharge end of said gas supply passageway for inhibiting the flow of environmental gas up said beam passage and into said evacuated vessel.

2. The apparatus of claim 1 wherein said gas supply passageway comprises:
   oppositely disposed inner and outer wall surfaces cooperating to define a conduit therebetween which is connected at its inlet end with said source of gas, said outer wall surface terminating at said beam exit aperture and said inner wall surface terminating at said beam passage.

3. The apparatus of claim 2 wherein the beam exit aperture defined by said beam passage further comprises:
   an angled wall surface in the direction of gas flow at the side of said beam passage opposite the discharge end of said conduit, said angled wall surface being aligned with the terminal portion of said inner wall of said conduit.

4. The apparatus of claim 3 wherein the inner and outer wall surfaces of said conduit further comprise:
   parallel spacially separated walls in the region directly upstream of said beam passage, said parallel walls being inclined at an angle of between 40° and 50° with respect to the beam axis.

5. The apparatus of claim 4 wherein said means for inhibiting the flow of environmental gas up said beam passage comprises:
   means forming a stage of a cascaded vacuum system, said means communicating with said beam passage upstream of the termination of the inner wall surface of said gas supply conduit.

6. The apparatus of claim 5 wherein said vacuum stage forming means comprises:
   means defining a gas withdrawal passage communicating at one end with said beam passage upstream of the termination of said inner wall surface,
   a vacuum pump, and
   means connecting said vacuum pump to the other end of said gas withdrawal passage.

7. The apparatus of claim 2 wherein said means for inhibiting the flow of environmental gas up said beam passage comprises:
   means forming a stage of a cascaded vacuum system, said means communicating with said beam passage upstream of the termination of the inner wall surface of said gas supply conduit.

8. The apparatus of claim 7 wherein said vacuum stage forming means comprises:
   means defining a gas withdrawal passage communicating at one end with said beam passage upstream of the termination of said inner wall surface,
   a vacuum pump, and
   means connecting said vacuum pump to the other end of said gas withdrawal passage.

9. The apparatus of claim 3 wherein said means for inhibiting the flow of environmental gas up said beam passage comprises:
   means forming a stage of a cascaded vacuum system, said means communicating with said beam passage upstream of the termination of the inner wall surface of said gas supply conduit.

10. The apparatus of claim 9 wherein said vacuum stage forming means comprises:
  means defining a gas withdrawal passage communicating at one end with said beam passage upstream of the termination of said inner wall surface,
  a vacuum pump, and
  means connecting said vacuum pump to the other end of said gas withdrawal passage.

11. The apparatus of claim 3 wherein said source of gas comprises:
  a source of inert gas maintained at a pressure between 20 and 30 pounds per square inch.

References Cited
UNITED STATES PATENTS

| | | | |
|---|---|---|---|
| 2,824,232 | 2/1958 | Steigerwald | 219—121 |
| 2,899,556 | 8/1959 | Schopper et al. | 219—121 |
| 3,156,811 | 11/1964 | Barry | 219—121 |
| 3,162,749 | 12/1964 | Peracchio | 219—121 |
| 3,171,943 | 3/1965 | Niedzielski | 219—121 |
| 3,175,073 | 3/1965 | Niedzielski et al. | 219—121 |

RICHARD M. WOOD, *Primary Examiner.*

W. D. BROOKS, *Assistant Examiner.*